US010865780B2

(12) United States Patent
Chiara et al.

(10) Patent No.: US 10,865,780 B2
(45) Date of Patent: Dec. 15, 2020

(54) METHOD AND SYSTEM FOR MULTI-STAGE COMPRESSION OF A GAS USING A LIQUID

(71) Applicant: Ohio State Innovation Foundation, Columbus, OH (US)

(72) Inventors: Fabio Chiara, Columbus, OH (US); James Durand, Columbus, OH (US); Robert Underhill, Powell, OH (US); Gerald Fly, Geneseo, NY (US); Matteo Triberti, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 415 days.

(21) Appl. No.: 15/827,601

(22) Filed: Nov. 30, 2017

(65) Prior Publication Data

US 2018/0080441 A1 Mar. 22, 2018

Related U.S. Application Data

(63) Continuation of application No. 14/505,122, filed on Oct. 2, 2014, now Pat. No. 9,903,355.

(Continued)

(51) Int. Cl.
*B01D 53/26* (2006.01)
*F04B 39/00* (2006.01)
(Continued)

(52) U.S. Cl.
CPC ............ *F04B 39/0011* (2013.01); *C10L 3/10* (2013.01); *F04B 41/02* (2013.01); *F04F 5/46* (2013.01);
(Continued)

(58) Field of Classification Search
CPC . B01D 2252/2026; B01D 53/263; C10L 3/10; F04B 39/0011; F04B 41/02; F04F 5/46; F15B 21/06; F15B 3/00
See application file for complete search history.

(56) References Cited

U.S. PATENT DOCUMENTS

| 451,460 A | 5/1891 | Craven |
| 586,100 A | 7/1897 | Knight |

(Continued)

FOREIGN PATENT DOCUMENTS

| CN | 201363546 | 12/2009 |
| CN | 101815893 | 8/2010 |

(Continued)

OTHER PUBLICATIONS

International Search Report and Written Opinion, dated Feb. 23, 2015, received in connection with International Application No. PCT/US2014/066632.

(Continued)

*Primary Examiner* — Cabrena Holecek
(74) *Attorney, Agent, or Firm* — Meunier Carlin & Curfman LLC

(57) ABSTRACT

A method of compressing a gas includes pumping, using a pump, at least a portion of a liquid contained in a first chamber to a second chamber containing a gas at a first pressure such that the portion of the liquid pumped into the second chamber compresses the gas in the second chamber to a second pressure greater than the first pressure, wherein the portion of the liquid pumped into the second chamber is admitted into the second chamber so that the admitted liquid flows along an internal surface of the second chamber.

20 Claims, 12 Drawing Sheets

Related U.S. Application Data

(60) Provisional application No. 61/906,462, filed on Nov. 20, 2013.

(51) Int. Cl.
| | |
|---|---|
| *F04B 41/02* | (2006.01) |
| *F15B 21/06* | (2006.01) |
| *F15B 3/00* | (2006.01) |
| *C10L 3/10* | (2006.01) |
| *F04F 5/46* | (2006.01) |

(52) U.S. Cl.
CPC .............. *F15B 3/00* (2013.01); *B01D 53/263* (2013.01); *B01D 2252/2026* (2013.01); *F15B 21/06* (2013.01)

(56) References Cited

U.S. PATENT DOCUMENTS

| | | | |
|---|---|---|---|
| 1,326,652 | A | 12/1919 | Ehrhart |
| 1,509,660 | A | 9/1924 | McKerahan |
| 2,061,938 | A | 11/1936 | Griswold |
| 3,337,121 | A | 8/1967 | Coanda |
| 4,585,039 | A | 4/1986 | Hamilton |
| 5,085,809 | A | 2/1992 | Stirling |
| 5,387,089 | A | 2/1995 | Stogner et al. |
| 6,120,253 | A | 9/2000 | Graves |
| 6,331,195 | B1 | 12/2001 | Faust et al. |
| 6,619,930 | B2 | 9/2003 | Jansen et al. |
| 6,652,243 | B2 | 11/2003 | Krasnov |
| 6,901,973 | B1 | 6/2005 | Hall et al. |
| 9,803,802 | B2 | 10/2017 | Cantemir et al. |
| 2005/0284155 | A1* | 12/2005 | Bhatt ................... F04F 1/06 62/50.2 |
| 2007/0000016 | A1 | 1/2007 | Handa |
| 2008/0209916 | A1 | 9/2008 | White et al. |
| 2010/0139777 | A1 | 6/2010 | Whiteman |
| 2011/0155278 | A1 | 6/2011 | Ding |
| 2011/0277860 | A1 | 11/2011 | Mazumdar et al. |
| 2011/0314800 | A1 | 12/2011 | Fong et al. |
| 2013/0287598 | A1* | 10/2013 | Fourneron ............... F04B 9/12 417/53 |

FOREIGN PATENT DOCUMENTS

| | | |
|---|---|---|
| CN | 103334899 | 10/2013 |
| CN | 103370495 | 10/2013 |
| CN | 203257492 | 10/2013 |
| WO | 2009035311 | 3/2009 |
| WO | 2009056856 | 5/2009 |
| WO | 2013148707 | 10/2013 |
| WO | 2013177309 | 11/2013 |
| WO | WO-2013177309 A1 * | 11/2013 .............. F04F 99/00 |

OTHER PUBLICATIONS

International Preliminary Report on Patentability, dated May 14, 2014, received in connection with International Application No. PCT/US2013/042273.

International Search Report and Written Opinion, dated Oct. 8, 2013, received in connection with International Application No. PCT/US2013/042273.

Extended European Search Report of the European Patent Office, Application No. 13793286.9, dated Mar. 8, 2016, 5 pages.

Examiner Interview Summary issued in co-pending U.S. Appl. No. 14/402,858, dated Jun. 7, 2017.

Notice of Allowance issued in co-pending U.S. Appl. No. 14/402,858, dated Jun. 28, 2017.

Extended European Search Report issued by the European Patent Office in Application No. 14863933.9 dated Nov. 8, 2016, 10 pages.

Office Action and English translation, Chinese Application No. 201380026927.6, dated Aug. 4, 2015, 12 pages.

Office Action, Chinese Application No. 201480063703.7, dated Apr. 5, 2017, 7 pages.

Communication Pursuant to Article 94(3) EPC. Issued by the European Patent Office in Application No. 14863933.9 dated Jun. 3, 2019. 4 pages.

* cited by examiner

METHOD AND SYSTEM FOR MULTI-STAGE COMPRESSION OF A GAS USING A LIQUID

CROSS-REFERENCE TO RELATED APPLICATIONS

This application is a continuation application of U.S. application Ser. No. 14/505,122 filed Oct. 2, 2014, which claims priority to and benefit of U.S. provisional patent application No. 61/906,462 filed on Nov. 20, 2013, both of which are fully incorporated by reference and made a part hereof.

BACKGROUND

Compressed gas is useful in a number of different applications. For example, compressed natural gas vehicles include a tank for storing compressed natural gas used for propulsion. The tank stores the gas at a high pressure for use by an engine of the vehicle. Currently, approaches used to compress gas from a low pressure source (e.g., a residential line) to a high pressure tank (e.g., a vehicle storage tank) include using direct mechanical compression. These direct mechanical compression approaches use a reciprocating piston movable within a cylinder to compress the gas. In use, these systems can be expensive as well as difficult to repair and/or maintain.

SUMMARY

One aspect of concepts presented herein includes a method of compressing gas. The method includes maintaining at least a first volume of liquid in a first chamber and maintaining at least a first volume of gas in a second chamber, wherein the first volume of gas is at a first pressure and the first chamber and the second chamber are fluidly connected through a pump. A pressurized gas is admitted into the first chamber having the first volume of liquid and simultaneously pumping, using the pump, at least a portion of the first volume of liquid in the first chamber to the second chamber, wherein the first volume of liquid pumped into the second chamber compresses the first volume of gas in the second chamber to a second pressure greater than the first pressure.

Optionally or alternatively, admitting the pressurized gas into the first chamber having the first volume of liquid further can comprise maintaining a second volume of liquid in a first low pressure chamber; maintaining a second volume of gas in a second low pressure chamber, wherein the first low pressure chamber and the second low pressure chamber are fluidly connected through a low pressure pump; and, pressurizing the second volume of gas in the second low pressure chamber by pumping, using the low pressure pump, at least a portion of the second volume of liquid in the first low pressure chamber to the second low pressure chamber, wherein the second low pressure chamber is fluidly connected with the first chamber and at least a portion of the pressurized second volume of gas is admitted into the first chamber and gas is drawn into the first chamber as the at least a portion of liquid in the first low pressure chamber is pumped to the second low pressure chamber.

Optionally or alternatively, admitting the pressurized gas into the first chamber having the first volume of liquid further comprises pressurizing a second volume of gas using one or more mechanical piston compressors and at least a portion of the pressurized second volume of gas is forced into the first chamber.

Another aspect includes a system for compressing gas. The system includes a first chamber having a first volume of liquid, wherein a pressurized gas is admitted into the first chamber having the first volume of liquid; a pump; and a second chamber, wherein a first volume of gas is maintained in the second chamber and wherein the first volume of gas is at a first pressure and the first chamber and the second chamber are fluidly connected through the pump. As the pressurized gas is admitted into the first chamber, at least a portion of the first volume of liquid in the first chamber is simultaneously pumped to the to the second chamber, wherein the at least a portion of the first volume of liquid pumped into the second chamber compresses the first volume of gas in the second chamber to a second pressure greater than the first pressure.

Alternatively or optionally, the system can further comprise a first low pressure chamber having a second volume of liquid; a second low pressure chamber having a second volume of gas, wherein the first low pressure chamber and the second low pressure chamber are fluidly connected through a low pressure pump. The second volume of gas in the second low pressure chamber is pressurized by pumping, using the low pressure pump, at least a portion of the second volume of liquid in the first low pressure chamber to the second low pressure chamber, wherein the second low pressure chamber is fluidly connected with the first chamber and at least a portion of the pressurized second volume of gas is forced into the first chamber.

Alternatively or optionally, the system can further comprise one or more mechanical piston compressors, wherein admitting the pressurized gas into the first chamber having the first volume of liquid further comprises pressurizing a second volume of gas using the one or more mechanical piston compressors and at least a portion of the pressurized second volume of gas is forced into the first chamber.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

DETAILED DESCRIPTION

Figure 1:
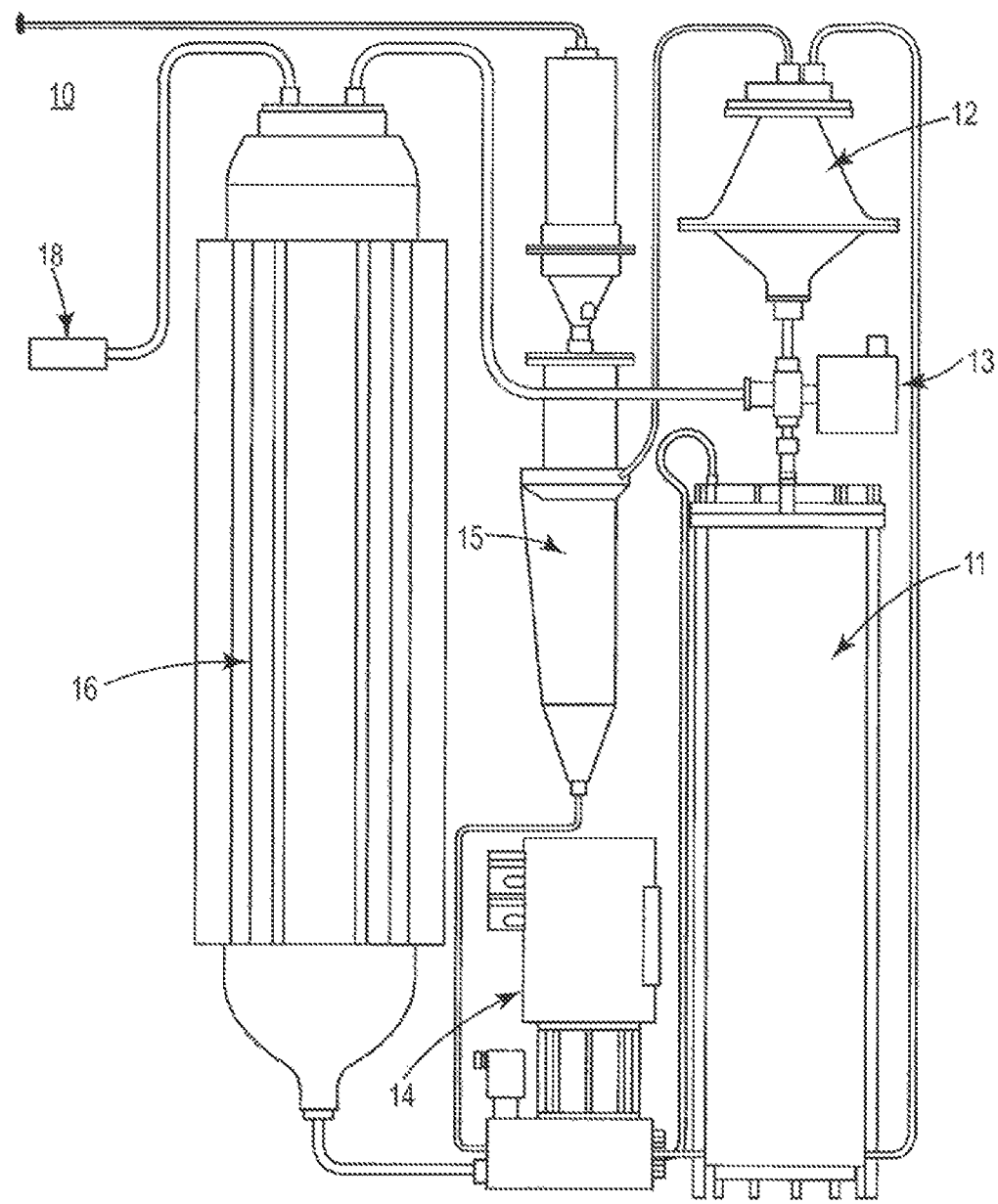
FIG. 1 is a schematic view of a system for compressing gas using a liquid.

FIG. 1 is a schematic view of a system 10 capable of implementing a process using a pressurized liquid (e.g., water, gasoline, diesel fuel, etc.) to compress a gas (e.g., natural gas, hydrogen, inert gasses, etc.). Optionally, this disclosure contemplates that the pressurized liquid can be a mixture of fluids such as water and monoethylene glycol (MEG), for example. Fluid mixtures can be used to ensure operations at extreme temperatures. It will be appreciated that system 10 can include components such as valves and the like to facilitate transfer of fluid within the system. As illustrated, the system 10 includes a first, low pressure (LP) compression chamber 11, a second, high pressure (HP) compression chamber 12, a transfer valve 13, a pump assembly 14, a separation assembly 15 and a liquid tank 16. Details of these components in system 10 are provided below. In general; however, the system 10 utilizes two stages of liquid compression (a first stage within the LP chamber 11 and a second stage within the HP chamber 12) coupled with a technique for cooling the gas during compression. During compression, a liquid piston is formed within a respective chamber and operates to compress gas within the chamber as well as provide a suitable medium for heat transfer from the compressed gas. In an alternative embodiment, system 10 can include only a single compression chamber. The single compression chamber in this embodiment would operate in a similar manner to the chambers 11 and 12 discussed herein.

In one example method for compression, gas enters the system 10 from a source 18 (e.g., a residential natural gas line) at a low pressure (e.g., not greater than 25 bar, usually approximately 0.5 bar or less). In a first stage of compression, the gas is compressed to a higher, intermediate pressure (e.g., approximately 20-22 bar) in the LP chamber 11 by liquid provided from the tank 16 using pump assembly 14. In one embodiment, the LP chamber 11 can have a fixed internal volume (e.g., about 20 liters). Subsequently, in a second stage of compression, the gas is compressed to yet a higher, storage pressure (e.g., at least 200 bar, approximately 400 bar) in the HP chamber 12 also by liquid provided from the tank 16 using the pump assembly 14. In one embodiment, the HP chamber 12 also has a fixed internal volume (e.g., about 2 liters).

Once the gas is compressed in the LP chamber 11 to the intermediate pressure, transfer valve 13 is used to transfer gas to the HP chamber 12. Pump assembly 14, in one embodiment, includes at least two pumps used to introduce the liquid to chambers 11 and 12 such that the gas is compressed to a desired exiting gas pressure. In one example, the pump assembly 14 includes a first pump designed to achieve high volumetric flow/low pressure of fluid within system 10 and a second pump designed to achieve high pressure/low volumetric flow of fluid within system 10. Regardless of configuration of pump assembly 14, gas exiting HP chamber 12 is then filtered to remove water or other impurities in the separation assembly 15 prior to being delivered to a storage tank (e.g., located on a vehicle).

The liquid used for compression is continuously recirculated and stored in the tank 16. In one embodiment, the liquid is pressurized with compressed gas from the compressed gas source 18. In one embodiment, the source 18 includes one or more valves to control entry of gas into the tank 16. Transfer valve 13 can control entry of gas from the tank 16 to chamber 11 as well as entry of gas from LP chamber 11 to HP chamber 12. Pump assembly 14 is configured to provide liquid from tank 16 to LP chamber 11, HP chamber 12 and receive liquid from the separation assembly 15. If desired, the tank 16 can include one or more cooling features (e.g., external cooling fins) to dissipate residual heat in the liquid.

Optionally, transfer valve 13 can be a three-way valve. It should be understood that transfer valve 13 can be electrically controlled (e.g., repositioned by sending a control signal to transfer valve 13). For example, transfer valve 13 can control entry of gas from the gas source 18 into the LP chamber 11 when in a first position, transfer valve 13 can control entry of gas from the gas source 18 into the HP chamber 12 when in a second position and transfer valve 13 can control flow of gas between the LP chamber 11 and the HP chamber 12 when in a third position. For instance, in the first position, transfer valve 13 controls the flow of gas from the gas source 18 into the LP chamber 11. As discussed above, the gas can then be compressed to an intermediate pressure in the LP chamber 11 by introducing liquid into the LP chamber 11. When the gas is compressed to the intermediate pressure, transfer valve 13 can be repositioned to the third position in order to control the flow of gas between the LP chamber 11 and the HP chamber 12. Optionally, while the gas flows from the LP chamber 11 to the HP chamber 12, the liquid can continue to be introduced, and in some implementations, liquid can flow from the LP chamber 11 to the HP chamber 12. The liquid that enters the HP chamber 12 can prevent the gas from flowing backward from the HP chamber 12 to the LP chamber 11. Then, when a small amount of liquid is introduced into the HP chamber 12 from the LP chamber 11, transfer valve 13 can be repositioned to the second position to control the entry of gas from the gas source 18 into the HP chamber 12 though generally gas flows from the gas source 18 into the LP chamber 11. As discussed above, the gas can then be compressed to a storage pressure in the HP chamber 12 by introducing liquid into the HP chamber 12.

The LP chamber 11 and HP chamber 12 operate identical in principle and, for sake of brevity, only the LP chamber 11 is discussed in detail below. Principles explained with respect to LP chamber 11 are applicable to the structure and operation of HP chamber 12. As discussed in more detail below, each of the chambers include a liquid piston operable to compress a gas. In one embodiment, a Coanda nozzle is used having a curved profile that operates to inject a liquid into a respective chamber. Other embodiments include a spiral path along the interior wall of the compression chamber, that the liquid follows as it travels from the top of the compression chamber to the rising liquid level which forms the liquid piston. In general, this application covers the various ways that a liquid can be released from the top of the compression chamber to encourage the interaction between the liquid and the gas. In general, a volume of gas is introduced into the chamber. Liquid is subsequently injected into the chamber through the nozzle and, in one embodiment, according to the Coanda effect, entrains the gas as the liquid flows along the curved surface of the nozzle. As liquid level rises in the chamber a liquid piston is formed. In addition, in one embodiment, the Coanda nozzle and compression chamber are designed to enhance the circulation of the gas and hence the interaction of the gas with the liquid, while the gas is being compressed within the chamber. Due to the liquid within the chamber, the liquid can cool the gas (as it is compressed) at a high rate of heat transfer and in fact can approach isothermal compression (i.e., a minimal change of gas temperature within the chamber during gas compression).

Figure 2:
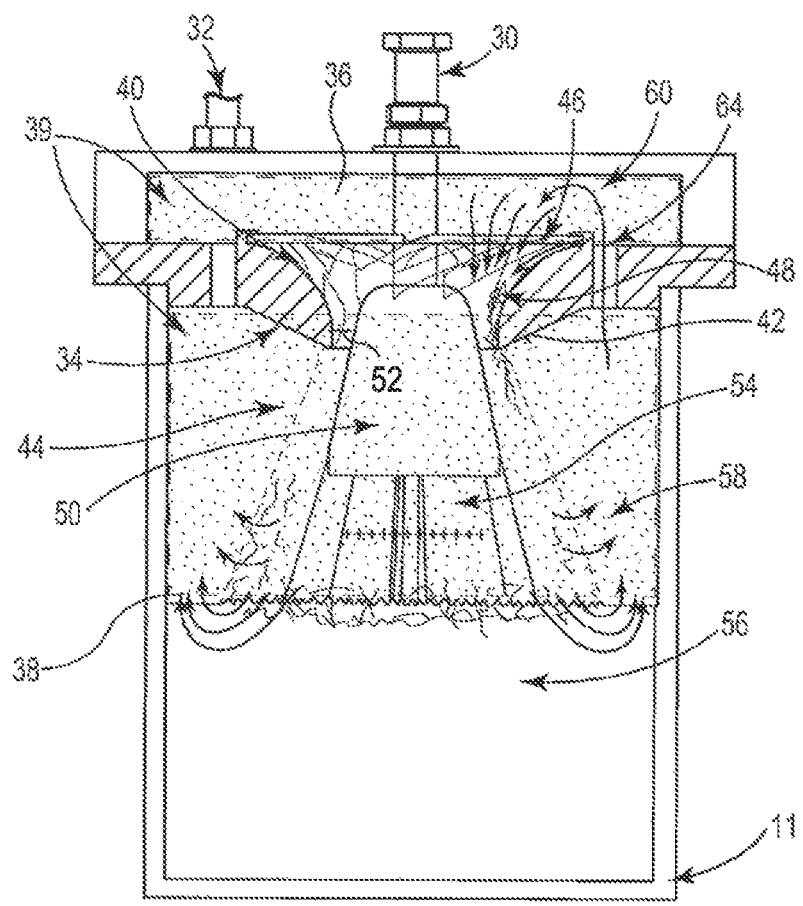
FIG. 2 is a schematic sectional view of a compression chamber used in the system of FIG. 1.

FIG. 2 shows a cross section of the LP chamber 11 where gas introduced into the chamber 11 via a gas inlet 30 is compressed using a liquid introduced through a liquid inlet 32. Inlet 32 is fluidly coupled to a nozzle 34 that divides the chamber 11 between an upper portion 36 and a lower portion 38. A volume of gas 39 is positioned in the upper portion 36 and lower portion 38 for compression. In one embodiment, nozzle 34 operates according to the Coanda effect to entrain gas 39 in the chamber due to introduction of liquid into the nozzle 34. In particular, due to the Coanda effect, as the liquid flows at a high rate over a curved surface (i.e., nozzle 34), a high flow of the gas (i.e., gas 39 from upper portion 36) surrounding the nozzle 34 will also be entrained. It should be understood that for Coanda applications, the ratio between the primary fluid (e.g., the liquid) and secondary fluid (e.g., the gas) volumetric flows is significantly higher than can be achieved with ejectors, for instance, the ratio can be between approximately 10 and 80. The nozzle 34 also acts as a transfer pump using the liquid to entrain the gas and circulate a liquid-gas mixture through the chamber 11. As the liquid level rises, the gas in the chamber 11 is compressed.

Figure 3:
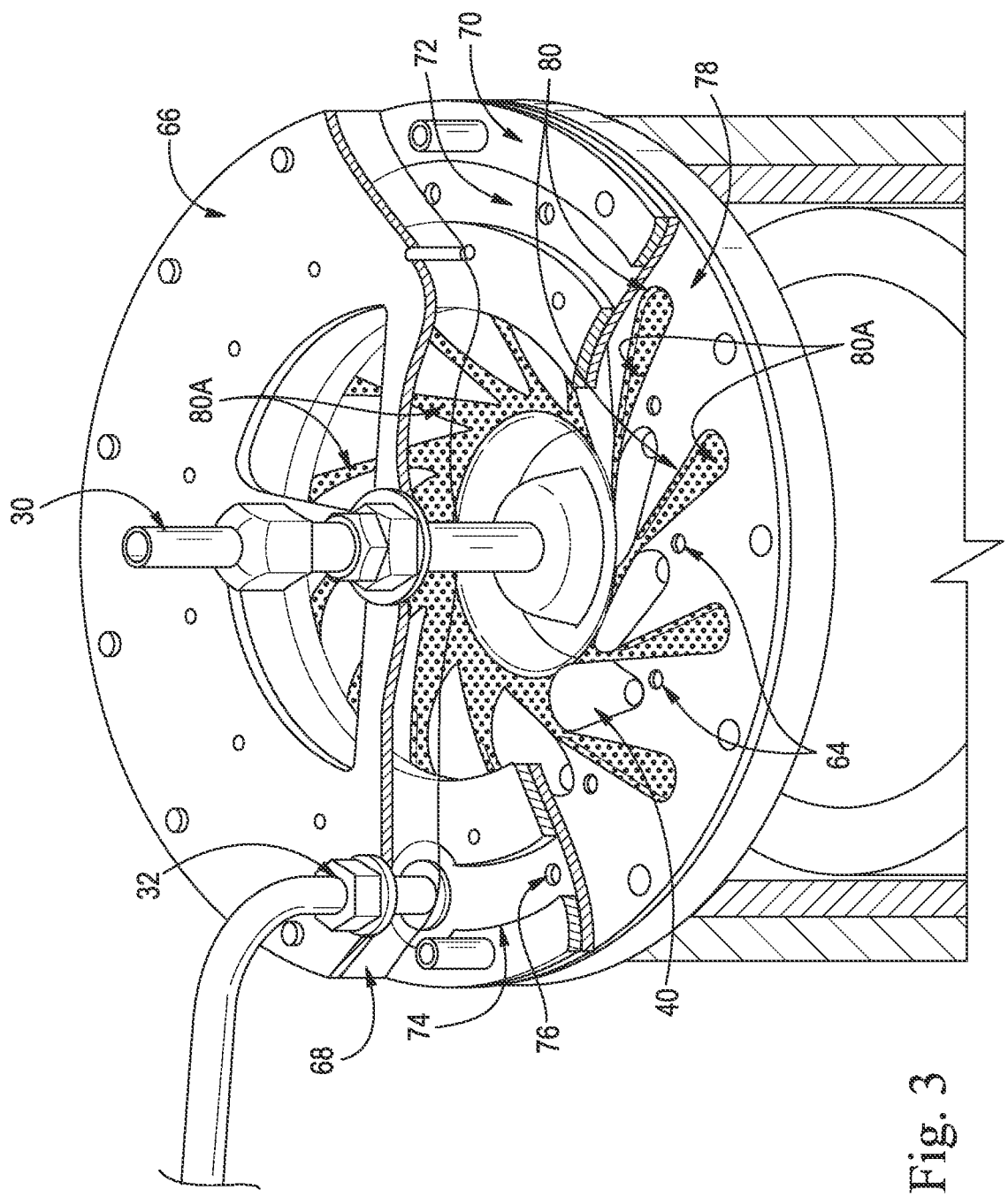
FIG. 3 is a schematic, partial sectional view of a nozzle for delivering liquid to the compression chamber illustrated in FIG. 2.

The nozzle 34 can take many forms. In the embodiment illustrated, the nozzle 34 converges along an entry portion 40 to a throat portion 42. In one embodiment, the liquid is injected into the nozzle 34 with high velocity (e.g., at least 10 m/s) from inlet 32 using pump assembly 14 and exits at throat portion 42 to form a liquid cone 44 extending from the nozzle 34. Liquid introduced to the nozzle 34 flows along the entry portion 40 as indicated by an arrow 46 in a cyclonic manner. Once exiting throat portion 42, the liquid continues to flow in the cyclonic manner to form the liquid cone 44. In the embodiment illustrated, the entry portion 40 is axisymmetric around a longitudinal axis of the nozzle 34. In one embodiment, the curved entry portion 40 can define a parabolic profile that includes one or more structural features (e.g., slots) to create desired turbulence in flow of liquid along the entry portion 40. Alternatively or additionally, as shown in FIG. 3, the curved entry portion 40 can define a parabolic profile having a smooth surface. Alternatively or additionally, the parabolic profile can include one or more structural features such as steps (e.g., bumps, raised portions, etc.) to create turbulence in the flow of liquid along the curved entry portion 40. During the flow of liquid, the Coanda effect will keep liquid jets, which are discussed in detail below, attached to the curved entry portion 40 so as to create an area 48 of low pressure and high turbulence over the entry portion 40. Due to the low pressure and high turbulence created in area 48, gas entrainment in the liquid jets is maximized from the upper portion 36, bringing the gas to the lower portion 38. Alternatively or additionally, one or more of the liquid jets can define a curved wall jet. Due to the destabilizing effect of the curvature on the turbulence in the outer part of the liquid jet, it is possible to increase the amount of gas entrainment in the liquid jet. This can increase the amount of mixing between the gas and the liquid, and therefore, can also increase the amount of heat and mass transfer between the gas and the liquid.

The nozzle 34 further includes a bell-shaped portion 50 disposed within the chamber along a longitudinal axis of the nozzle 34 in relation to throat portion 42. By changing a vertical position of the portion 50, a minimum cross section 52 of the throat portion 42 can be varied. In principle, a larger minimum cross section 52 will allow for a higher gas flow from the entry portion 40 to the cone 44. However, a smaller minimum cross section 52 will cause a direct increase in gas speed and enhance a turbulence level of a mixture of gas and liquid within chamber 11. Based on experimentation, a desired maximum heat transfer can be determined by adjusting flow, speed and turbulence of fluid within the chamber 11.

After liquid passes through the throat portion 42, the liquid forms the cone 44 with assistance from the bell-shaped profile 50. In one embodiment, an angle defined by the entry portion 40 and cone 44 is greater than 90 degrees. Additionally, or independently, a swirl component can be introduced in the entry portion 40 to create a cyclonic flow about the nozzle 34. In relation to the bell-shaped portion 50, the cone 44 can define a greater angle with respect to the entry portion 40 than a corresponding angle between the bell-shaped portion 50 and the entry portion 40. In this configuration, flow between the bell-shaped portion 50 and the cone 44 will have a diffuser effect with a slight increase of gas pressure at the end of the bell-shaped portion 50 at a zone 54 in relation to an average gas pressure within the chamber 11. This diffusing process can also increase turbulence within chamber 11. As a result of this configuration, gas will tend to escape at the bottom of the cone 44, either by passing through the cone 44 and/or through a liquid piston 56 formed in the chamber 11. As more liquid enters chamber 11, liquid piston 56 increases in volume to compress gas within the chamber 11.

Ultimately, gas escapes from the cone 44 as depicted by arrows 58. Once exited from the cone 44, gas is drawn to the upper portion 36 following arrow 60 via recirculation channels 64 positioned about the nozzle 34. In one embodiment, due to the configuration of the nozzle 34, gas within chamber 11 will circulate at least twenty times for each compression cycle. For the HP chamber 12, a small low head recirculation pump can be used to achieve a higher number of recirculation cycles to counteract the reduced heat exchange surface of the HP chamber 12.

FIG. 3 illustrates a partial sectional view of the nozzle 34. In one embodiment, as illustrated, the entry portion 40 is formed of a single unitary body. One embodiment includes the flow profile 40 having a geometry described (in a simplified form) by a parabola with an inclined axis of approximately 30-45 degrees and a D/a ratio of 2.5 to 4. In one embodiment, the entry portion 40 can be formed as described in U.S. Pat. No. 3,337,121.

From inlet 32, liquid flow is provided through a retaining plate 66 and cover plate 68. In an alternative embodiment, plates 66 and 68 can be formed of a single plate. The liquid is then provided to a delivery manifold formed by a first plate 70 and a second plate 72. The first plate 70 defines a central channel 74 for flow of liquid to apertures 76 provided in the second plate 72. Liquid provided through the apertures 76 is provided to a jet plate 78 fluidly coupled to the entry portion 40. The jet plate 78 defines a plurality of slots 80. Optionally, the apertures 76 provided in the second plate 72 can be aligned with the slots 80 in the jet plate 78. Upon entry of liquid into the slots 80, liquid jets (e.g., liquid jet 80A in FIG. 3) are formed and provided to the entry portion 40. Additionally, each of the slots 80 can define a nozzle such that the velocity of the liquid jets increase as they move through a converging portion of the nozzles prior to being provided to the entry portion 40. This disclosure contemplates that the slots 80 can be formed by laser cutting the jet plate 78, for example. This disclosure contemplates that the number and spacing between the slots 80 can vary to achieve the desired effect, e.g., the desired amount of entrainment of the gas and the liquid and heat and mass transfer between the gas and the liquid. Additionally, the slots 80 are formed proximate the recirculation channels 64 to enhance liquid and gas mixing. Optionally, the slots 80 and the recirculation channels 64 can be interleaved.

In the illustrated embodiment, the slots 80 are oriented at a 30 degree angle (relative to a tangent line of an outer circumference of the chamber 11) in order to produce a clockwise swirling motion of liquid entering the slots 80. This disclosure contemplates that that the slots can be oriented at angles other than 30 degree angle to produce the swirling motion. Alternatively or additionally, the slots 80 are not oriented approximately along a radius of the chamber 11 (e.g., a line extending from the center to the circumference of the chamber 11). Although different configurations can be utilized, each of the slots 80 in the illustrated embodiment converge from an entry point and each of the liquid jets formed by liquid flowing through the slots 80 then diverges to a general confluence of each of the liquid jets upon entering entry portion 40. Variations of the jet plate 78 can include parametric variations of the swirl angle for slots 80, a confluence distance for each slot 80, plate thickness, exit area for slot 80 and exit angle of slot 80. In one embodiment, the jet plate 78 can be made of a suitable metal alloy such as 6061 aluminum or stainless steel.

Figure 4:
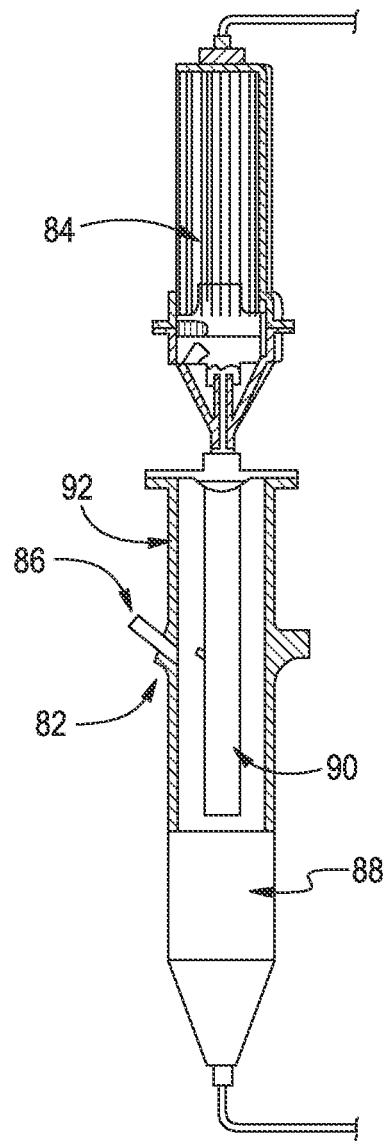
FIG. 4 is a schematic, view of a separation assembly used in the system of FIG. 1.

FIG. 4 schematically illustrates the separation assembly 15, which receives high pressure compressed gas from HP chamber 12. The compressed gas is mixed with the compressing liquid in a liquid/gas mixture due to the compression taken place within the LP chamber 11 and the HP chamber 12. The separation assembly 15 includes a cyclonic separator 82 forming a chamber and optionally a rotor blade 84 that is utilized to separate gas from the liquid and produce compressed, dry gas. The compressed gas from HP chamber 12 is first delivered to an inlet 86 of the cyclonic separator 82 from operation of pump assembly 14. The cyclonic separator 82 illustratively includes an outer tube 88 and an inner tube 90 positioned within the outer tube 88. In one embodiment, both the outer tube 88 and inner tube 90 are metallic (e.g., cast iron, stainless steel). Gas is introduced to the outer tube 88 through the inlet 86 at a slight downward angle and tangential to an inner wall 92 of the outer tube 88 in order to produce a swirl. Centrifugal forces within the swirl operate to separate liquid from the gas. In particular, the liquid is forced against the inner wall 92 and travels along the wall 92 toward a bottom of the separator 82. After the swirl rotation diminishes, gas is transferred by the inner tube 90 to the rotor blade 84. In particular, gas turns 180 degrees into the inner tube 90 as the liquid, due to its high inertia, has the tendency to collect at the bottom of the outer tube 88.

Figure 5:
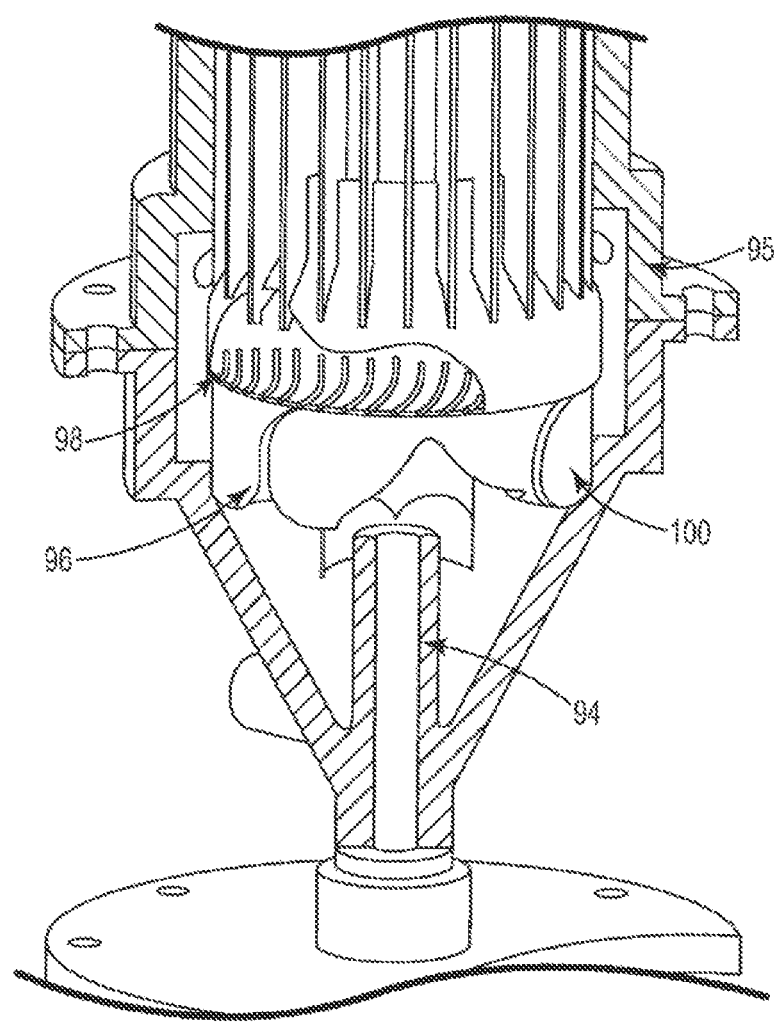
FIG. 5 is a schematic sectional view of a portion of the separation assembly of FIG. 4.

FIG. 5 illustrates a portion of the rotor blade 84 that receives compressed gas from the inner tube 90 through an inlet 94. In one embodiment, the rotor blade 84 is formed from a plastic material and positioned within a housing 95. The rotor blade 84 can be supported by lubrication free, high chemical resistance rolling bearings. The rotor blade 84 is driven by energy from flow of the gas from inner tube 90. After passing through inlet 94, the gas is accelerated using at least one nozzle 96 (two of which are illustrated) at a high speed (e.g., a speed of approximately 50 mls) and delivered at a shallow angle to a turbine 98 that includes a plurality of circumferentially spaced curved blades. The turbine 98 is a built as part of the rotor blade 84 and is located at the bottom of the rotor blade 84. The nozzles 96 are carved in a bearing carrier 100 positioned to receive flow from the inlet 94. It will be appreciated that different configurations for the nozzles 96 (e.g., number of nozzles, entry and exit angles for the nozzles) can be utilized.

Figure 6:
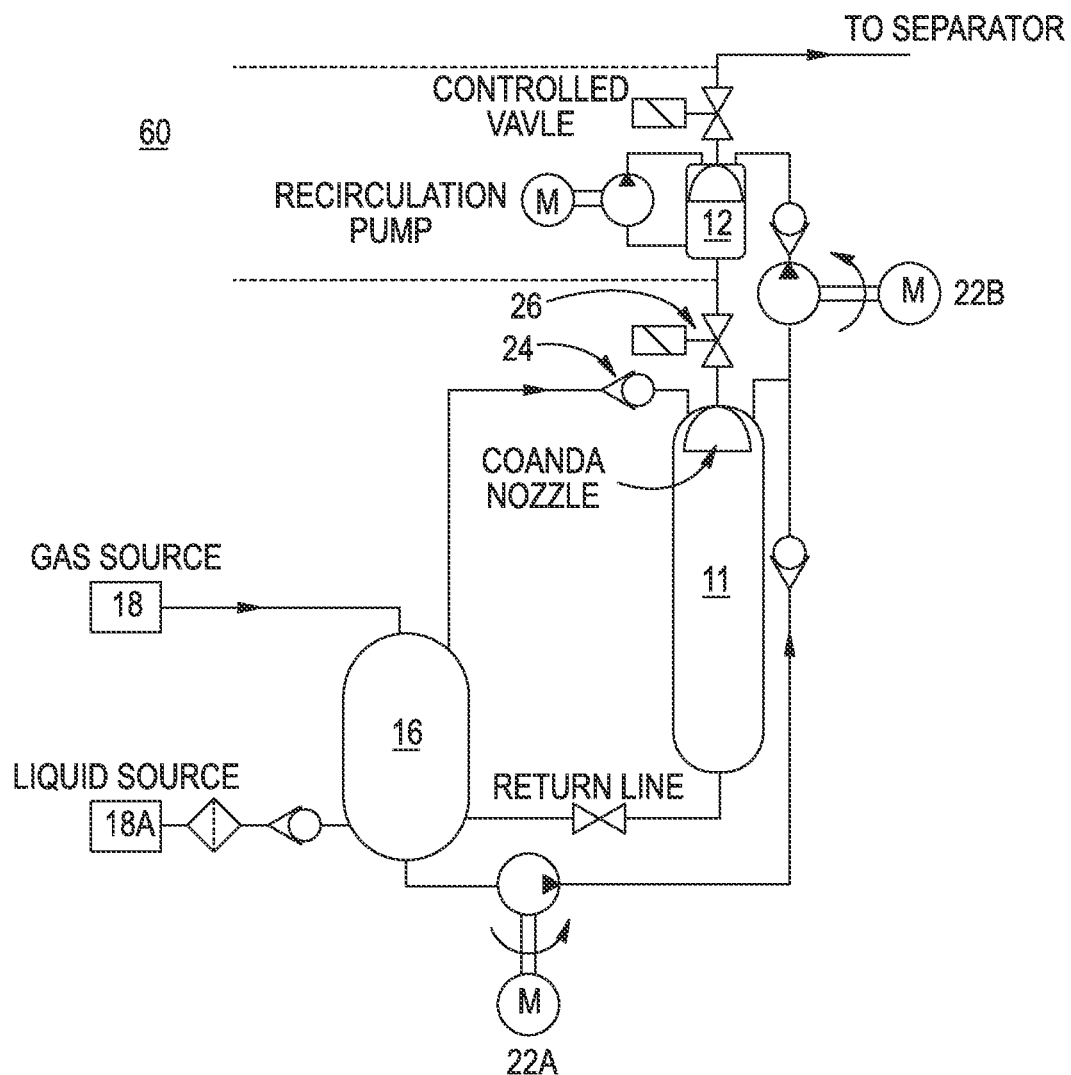
FIG. 6 is a schematic view of another system for compressing gas using a liquid, showing two stages of compression.

FIG. 6 is a schematic view of another system 60 for implementing a process using pressurized liquid to compress a gas. The system 60 includes a LP chamber 11, a HP chamber 12 and a liquid tank 16. These system components are discussed in detail above with regard to FIG. 1 and are therefore not discussed in further detail below. It should be understood that the system 60 can include components such as valves, piping and the like to facilitate transfer of fluids (e.g., pressurized liquid and/or gas) within the system 60. Similar to FIG. 1, gas can be supplied to the system 60 from a gas source 18. A check valve or one-way valve 24 can be provided along the gas supply line to prevent gas from returning to the tank 16 when the compression process begins. Additionally, liquid can be supplied to the tank 16 from a liquid source 18A.

Also similar to FIG. 1, in FIG. 6, the gas can be compressed to a higher, intermediate pressure in the LP chamber 11 by liquid provided from the tank 16 during a first stage of compression. Subsequently, in a second stage of compression, the gas can be compressed to yet a higher, storage pressure in the HP chamber 12 by liquid provided from the tank 16. Additionally, as discussed above with regard to FIG. 1, after the second stage of compression, the gas can flow to a separator assembly fluidly connected to the HP chamber 12, where liquid can be removed from the gas such that dry, compressed gas remains. In FIG. 6, the pump assembly can include a plurality of pumps, for example, two pumps 22A-22B. Pumps 22A-22B can be used to supply liquid to the LP chamber 11 and the HP chamber 12. In other words, pumps 22A-22B can be used to power the liquid pistons. Specifically, pump 22A can be used to supply liquid to the LP chamber 11, and pump 22B can be used to supply liquid to the HP chamber 12.

Optionally, pump 22A can be a high volumetric flow, low pressure pump, which is appropriate for the flow requirements of the LP chamber 11. For example, pump 22A can be a multi-stage centrifugal pump. Alternatively or additionally, pump 22B can be a low volumetric flow, high pressure pump, which is appropriate for the flow requirements for the HP chamber 12. For example, pump 22B can be a radial piston pump. In addition, pumps 22A-22B can optionally be fluidly connected in series. As shown in FIG. 6, pump 22A can provide liquid to both the LP chamber 11 and pump 22B. In this configuration, pump 22A can provide suction head for pump 22B. Additionally, according to this configuration, when pumps 22A-22B are operated in series, the LP chamber 11 and HP chamber 12 can be supplied with liquid (and compression can be performed) at the same time, e.g., simultaneously, in the LP and HP chambers. For example, to compress gas in the LP chamber 11, liquid can be pumped from the tank 16 to the top of the LP chamber 11, where the liquid is injected through the entrance geometry, in one embodiment the Coanda nozzle, which results in entrainment of gas and heat transfer between the liquid and gas. At the same time, liquid can be pumped from the tank 16 to the top of the HP chamber 12, where the liquid is injected through the Coanda nozzle, which results in entrainment of gas and heat and mass transfer between the liquid and gas. The compression processes are therefore performed in batch, with the two liquid pistons operating simultaneously. Additionally, pumps 22A-22B and their arrangement in the system 60 can be selected to minimize energy consumption.

Alternatively or additionally, a control valve 26 can be provided between the LP chamber 11 and the HP chamber 12. The control valve 26 can control flow of fluid (e.g., gas and/or liquid) between the LP and HP chambers. Optionally, the HP chamber 12 can be arranged or positioned above (e.g., at a higher height with respect to) the LP chamber 11. In this configuration, when the control valve 26 is in an open position (e.g., allowing fluid to flow between the LP and HP chambers), the compressed gas in the LP chamber 11 can be transferred into HP chamber 12. Additionally, as shown in FIG. 6, the liquid return from the HP chamber 12 (e.g., the liquid used for compressing gas during the previous cycle) is through the LP chamber 11. Thus, by the force of gravity, the liquid can also be transferred from the HP chamber 12 to the LP chamber 11 through the control valve 26. As discussed above, the liquid can then ultimately be returned to the tank 16, where the liquid can optionally be cooled by convection, for example, before being re-used for injection into the LP and HP chambers during a subsequent compression cycle. In this configuration, a single control valve (e.g., control valve 26) can be used to transfer both the gas and liquid between the LP and HP chambers. Accordingly, it is possible to reduce the scavenging work that would otherwise be necessary to expel the compressed gas from the HP chamber 12.

Figure 7:
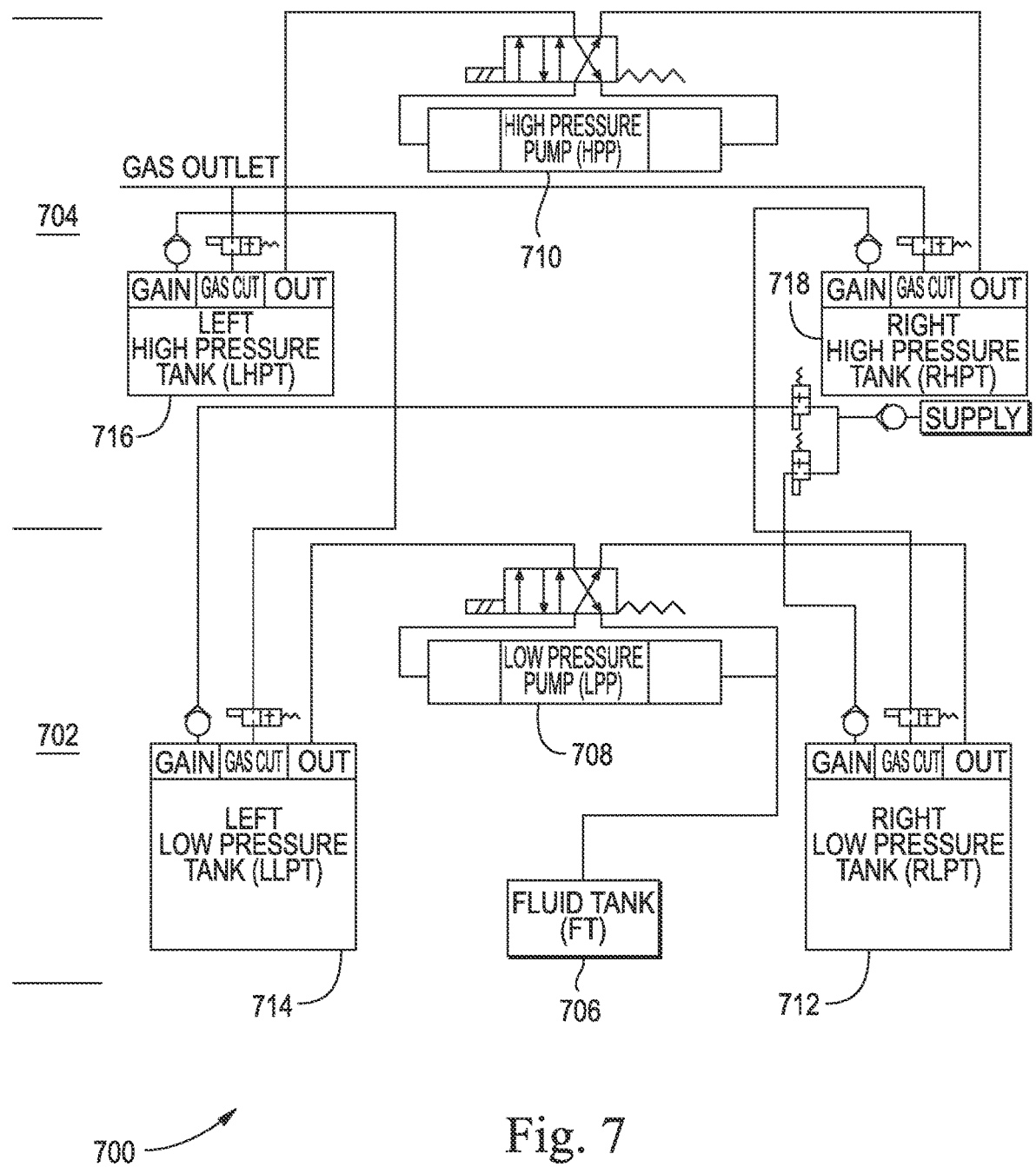
FIG. 7 is a schematic view of a two-stage system for compressing gas using a liquid that employs two sides for both the low and high pressure compression stages.

FIG. 7 is a schematic view of yet another embodiment of a system 700 for implementing a process using pressurized liquid to compress a gas. This embodiment of a system 700 comprises a multi-stage system for compressing gas using a liquid. Without losing generality, in order to explain the operation and functioning of the system, a two-stage compression system is taken as example, though it is to be appreciated that embodiments of the system 700 can comprise more or fewer compression stages. In the shown embodiment, the system 700 comprises a low pressure compression stage (LPC) 702, a high pressure compression stage (HPC) 704, a replenishment/refill fluid tank (FT) 706, a low pressure liquid pump (LPP) 708, a high pressure liquid pump (HPP) 710 and a series of valves and pipes connecting the chambers and pumps as shown in FIG. 7. The system can alternatively include a liquid/gas separation system (LGS), which is not shown in FIG. 7.

In the shown embodiment, the LPC 702 is comprised of two separate chambers, a first low pressure chamber 712 and a second low pressure chamber 714. The HPC 704 is also comprised of two separate chambers, a first high pressure chamber 716 and a second high pressure chamber 718. In one embodiment, the liquid, pressurized by the LPP 708, is introduced into the LPC 702 and it compresses the gas from an inlet pressure to an intermediate pressure higher than the inlet pressure. For example, if the inlet pressure is 1.1 bar, the intermediate pressure could reach about 20 bar. During compression of the gas to the intermediate pressure level (for example 20 bar), the gas is transferred from the LPC 702 to the HPC 704. At this stage, the HPP 710 introduces pressurized liquid into the HPC 704, further compressing the gas to a higher pressure up to a maximum pressure (for example 300 bar, or greater). This double sided system of this embodiment uses the pump more efficiently and reduces the power requirements for the pump.

In a similar manner, one embodiment of this system can be configured in such a way that a low pressure region is created in the low pressure compression chamber 712, 714 as the liquid is being pumped out of the chamber. This low pressure can draw or suck in the incoming gas used to recharge the low pressure compression chamber 712, 714, without the need of a booster compressor. In typical fixed compression ratio compressors, the inlet pressure that the incoming gas must have is fixed. Often this pressure is on the order of 1 to 2 bar or more. In the case of this embodiment of the device, the variable compression ratio feature of this system can be used on the entering side of the compressor to accept gas that is coming from the distribution line at a low pressure on the order of 0.1 to 1 bar, while still being able to meet the outlet gas pressure specifications.

Though not shown in FIG. 7, an alternative embodiment of a system 700 for implementing a process using pressurized liquid to compress a gas can be comprised by the combination of a conventional mechanical piston compression system (for example one stage (e.g. LPC 702 or HPC 704) and one or multiple stages of liquid piston compression depending on the final discharge pressure of the gas. For example, the LPC 702 can be replaced with one or more mechanical piston compressors that compress the gas to an intermediate pressure higher than the inlet pressure before it is introduced into the HPC 704 and compressed to a higher pressure up to a maximum pressure. This hybrid approach can exploit the advantages of both the conventional mechanical piston compression systems at low pressure and the highly efficient operation of the liquid piston system at high pressure.

The operation of a multi-stage compression system such as that shown in FIG. 7 is based on a "push-pull" sequence. The operating sequence for a two-stage compression process is shown in FIGS. 8A-8L as a series of diagrams representing different consecutive "time shots" of the system in operation. The system presented in FIG. 8 is characterized by a two-stage compression process. However, it is clear to anyone skilled in the art that a similar operation would be applicable to a system with higher or lower number of compression stages.

Figure 8A:
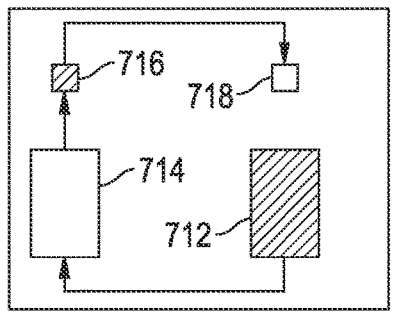
FIGS. 8A-8L are schematic views of a sequence of compression phases for the two-stage system for compressing gas using a liquid.

FIG. 8A represents the start of a generic compression cycle after the starting sequence has been performed. In FIG. 8A, the first low pressure chamber 712 is fully filled with pressurized liquid (represented by darker shading), while the second low pressure chamber 714 is fully filled with gas (represented by lighter shading). Moreover, the second high pressure chamber 718 is filled with compressed gas at the intermediate pressure (for example 20 bar), while the first high pressure chamber 716 contains pressurized liquid from the HPP 710. In the LPC 702, the liquid is pumped by the LPP 708 from the first low pressure chamber 712 to the second low pressure chamber 714 to compress the gas in the second low pressure chamber 714. Simultaneously, or nearly simultaneously, the liquid is pumped by the HPP 710 from the first high pressure chamber 716 to the second high pressure chamber 718 to compress the gas contained in the second high pressure chamber 718. This system is therefore based on a gas "push-pull" sequence.

Figure 8B:
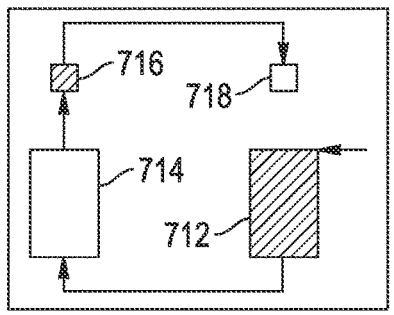

In FIG. 8B, a gas valve is opened in the first low pressure chamber 712 and gas starts flowing into the first low pressure chamber 712 from an external source such as, for example, a natural gas pipeline (not represented), a tank or reservoir, and the like while the liquid is pumped from the first low pressure chamber 712 to the second low pressure chamber 714 by the LPP 708. In one embodiment of this device, as the liquid is pumped from pressure chamber 712 to pressure chamber 714, a low pressure zone is created in low pressure chamber 712 which actually draws in the gas from the external source. Meanwhile, the HPP 710 pumps liquid from the first high pressure chamber 716 to the second high pressure chamber 718, compressing the gas in the second high pressure chamber 718 and drawing the gas from the low pressure chamber 714, into the high pressure chamber 716.

Figure 8C:
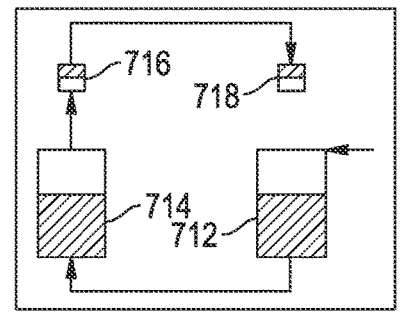

In FIG. 8C, gas keeps entering the first low pressure chamber 712 while liquid keeps on being pumped from the first low pressure chamber 712 to the second low pressure chamber 714 and from the first high pressure chamber 716 to the second high pressure chamber 718.

Figure 8D:
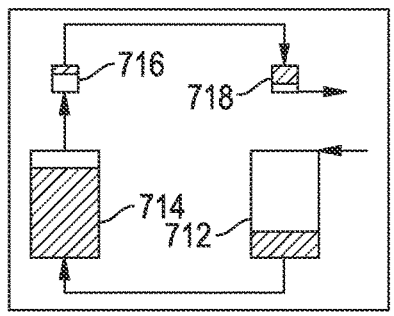

In FIG. 8D, the second high pressure chamber 718 reaches the desired gas pressure and a gas valve associated with the second high pressure chamber 718 is opened. Gas can then flow into a vehicle, storage tank, or the like or, alternatively, it can flow into a gas/liquid separation system (not depicted in FIG. 7 or 8). This introduces a significant feature of this embodiment. In conventional compression systems, the compressor has a fixed compression ratio so that the gas exiting the compressor will always be at the same pressure. As the compressor fills an empty tank, this means that the gas is compressed to the final high pressure and has to be throttled down or pressure reduced as the gas enters the tank. This represents a loss in the energy that has to be put into the gas to compress it up to the high pressure. In the case of this embodiment, the compression process is stopped (i.e., the height of the liquid piston is stopped) when the gas pressure is just above the level required to make the gas flow into the tank from the high pressure chamber.

Figure 8E:
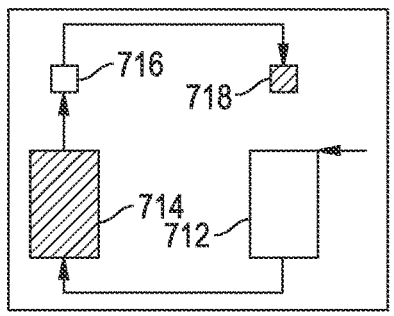
Figure 8F:
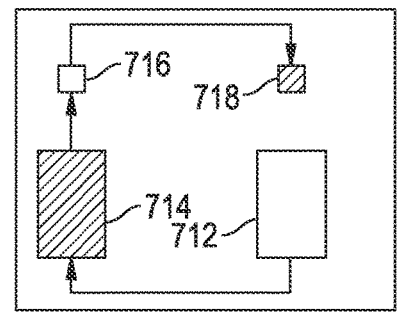
Figure 8G:
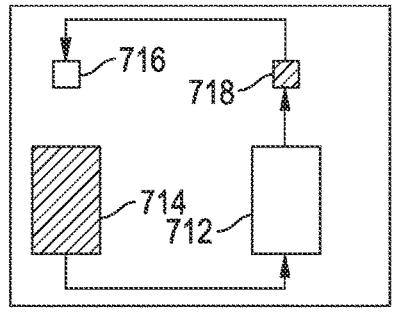
Figure 8H:
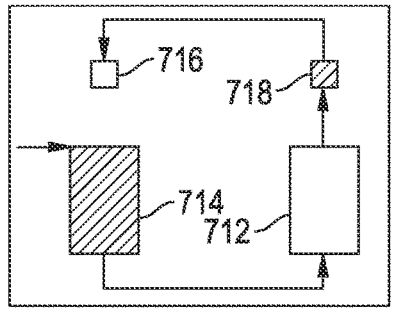
Figure 8I:
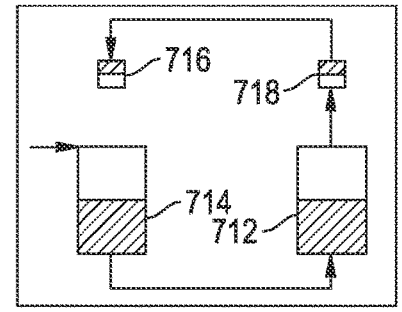
Figure 8J:
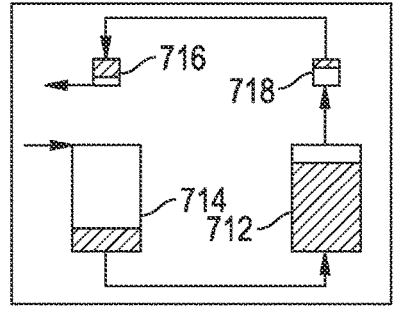
Figure 8K:
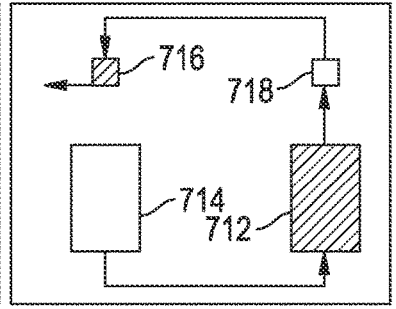
Figure 8L:
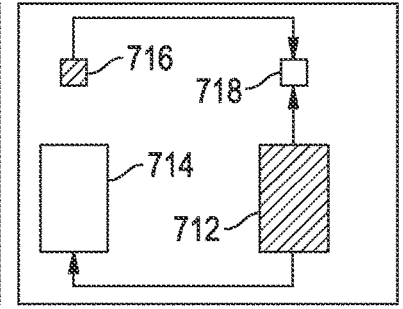

In FIG. 8E, all the gas in the second high pressure chamber 718 has been transferred to the separation system or other location, and the gas valve has been closed, meanwhile the first low pressure chamber 712 is now full of gas ready for compression. In 8F, the first low pressure chamber 712 gas valve is closed because the volume has been entirely filled with gas. After this, a new cycle starts.

FIGS. 8G-8L represent compression phases in which the liquid is now pumped by the LPP 708 from the second low pressure chamber 714 to the first low pressure chamber 712 so that the gas in the second low pressure chamber 714 is compressed. Conversely, the liquid is also pumped by the HPP 710 from the second high pressure chamber 718 to the first high pressure chamber 716 and the gas in the first high pressure chamber 716 is compressed.

The gas valves connecting the pipeline to the first low pressure chamber 712 and the second low pressure chamber 714, the valves connecting the first low pressure chamber 712 and the second low pressure chamber 714 to the first high pressure chamber 716 to the second high pressure chamber 718, the valves connecting the first high pressure chamber 716 to the second high pressure chamber 718 to the (optional) separation system, the HPP 710 and LPP 708 crossover valves and the valve connecting the liquid storage tank 706 to the LPP 708 suction are all actively controlled to provide maximum design and operation flexibility. However, it is clear to anyone skilled in the art that optimization of the valve design and of the actuation system (including the use of a manifold system which includes all the valves which may be actively or passively controlled) can be performed to reduce cost, and the number and complexity of the valve arrangement while keeping the basic functionality of the system intact.

In order to provide further technical details of the system, basic dimensioning of an exemplary embodiment of the system 700 is here disclosed. For example, for a system compressing a gas to 3600 psi and having a flow rate of gas of 2 scfm, typical geometric dimensions of the components can comprise the first low pressure chamber 712 and the second low pressure chamber 714 each having approximate volumes of 16 liters with a reserve of about 2 liters (approximate active volume of about 14 liters); the first high pressure chamber 716 and the second high pressure chamber 718 each having approximate volumes of about 1.2 liters each, with a reserve of about 0.2 liters each; a LPP 708 having a maximum pressure of about 300 psi and a flow rate of about 18 gallons/minute; a HPP 710 having a maximum pressure of about 4000 psi and a flow rate of about one (1) gallon/minute.

An alternative embodiment of the system shown in FIG. 7 further comprises a buffer volume. For example, a buffer chamber can be added between the low pressure compression stage (LPC) 702 and high pressure compression stage (HPC) 704. For example, the buffer chamber can be added between the second low pressure chamber 714 and the first high pressure chamber 716. The main function of the buffer chamber is to decouple the low-pressure and the high-pressure compression volumes. For example, one or both of the first and second low pressure compression chambers 712, 714 can discharge into the buffer chamber and the buffer chamber can discharge into one or both of the first and second high pressure compression chambers 716, 718. In case of a multi-stage system (more than two stages), a buffer chamber can be added between a low pressure stage and a medium pressure stage and/or between a medium pressure stage and a high pressure stage.

Figure 9:
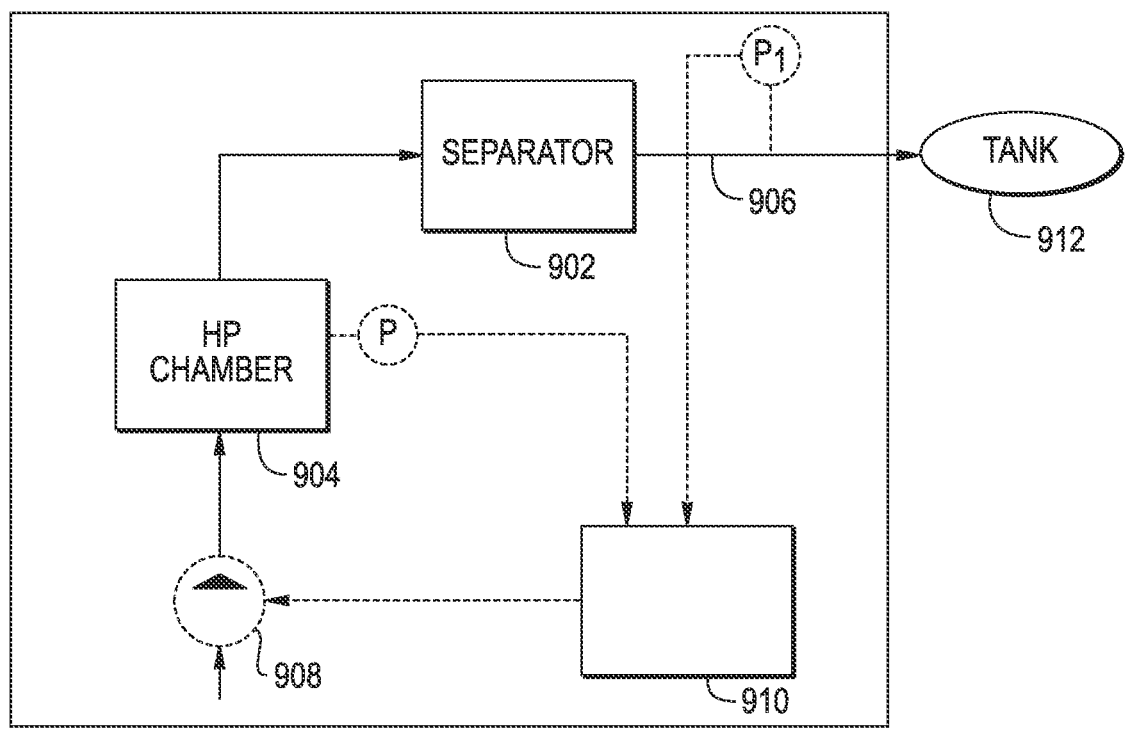
FIG. 9 is a schematic view of a control scheme of the high pressure chamber discharge pressure of a two-stage system for compressing gas using a liquid.

FIG. 9 is a schematical representation of an embodiment of a scheme to control the discharge pressure of the high pressure stage 702 into an (optional) separator system 902. The discharge pressure of the high pressure chamber 904 can be actively controlled in order to have the minimum pressure drop through the separation system 902, the interconnecting pipes and the final discharge pressure of the gas. As shown in FIG. 9, pressure in a separator-tank connecting line 906 can be measured or appropriately estimated (P1), also pressure in the high pressure chamber 904 can be measured or appropriately estimated (P2). By knowing these two pressures, a high pressure chamber 904 gas valve 908 connecting the HPC volume can be controlled using a control mechanism 910 in such a way to be opened when the pressure in the high pressure chamber 904 reaches the pressure P1 plus a desired pressure reserve to account for the pressure drop in the separator 902 and connecting lines.

The operation previously described in reference to FIG. 9 allows embodiments of the system for compressing a gas to effectively function as a variable compression ratio compressor. This allows for a significant efficiency increase, since this compression system is designed to compress the gas to a level that is just sufficient to overcome the current pressure in a storage tank 912. The pressure control 910 can also be achieved with a simple piloted check valve that mechanically opens when the pressure difference between the separator outlet (or the HP compression chamber outlet in case a separator is not present) and the discharge tank 912 reaches a pre-defined value.

As previously described herein, all the liquid piston compression chambers (e.g., first low pressure chamber 712, second low pressure chamber 714, first and second high pressure compression chambers 716, 718, etc.) can use a combination of means to allow for gas intra-cooling. This cooling allows for reaching near-isothermal operation and, thereby, increasing the efficiency of the compression process. One efficient way to achieve gas intra-cooling makes use of a Coanda profile utilizing the Coanda effect. To those skilled in the art, it is well known that the Coanda effect is characterized by the combination of three main elements: 1) Tendency of a fluid jet approaching a curved surface to remain attached to the surface; 2) Ability of a fluid jet to adhere to a close-by surface; and 3) Tendency of a jet flowing over convex curved surfaces to attract a large flow of surrounding fluid. Embodiments of the system described herein for compressing gas can make use of each of these elements, but specifically element 3).

Figure 10:
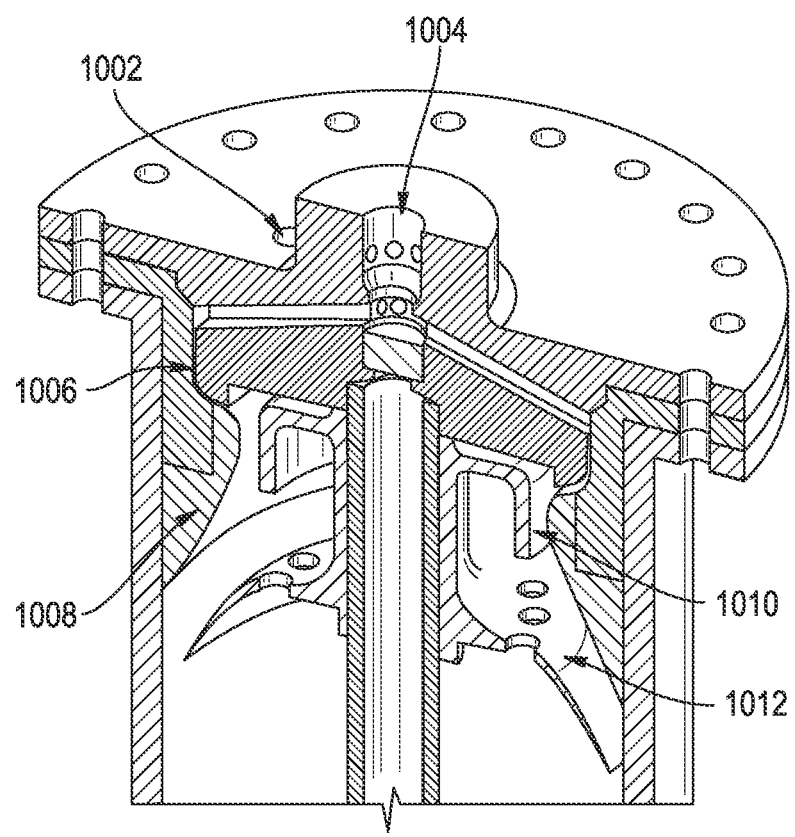
FIG. 10 is a cross-sectional view of a possible compression chamber of the two-stage system for compressing gas using a liquid.

FIG. 10 presents a cross-sectional view of a possible compression chamber of embodiments of the system described herein for compressing a gas. Generally, compression chambers (e.g., first low pressure chamber 712, second low pressure chamber 714, first and second high pressure compression chambers 716, 718, etc.) of embodiments of the system can be equipped with a gas admission port 1002, a liquid admission port 1004, a liquid admission slot 1006, a Coanda profile 1008, a shroud element 1010 and a screen 1012. Gas is inducted inside a compression chamber according to the sequence described herein as "push-pull" (FIGS. 8A-8L). After the gas is inducted in the chamber and completely fills the chamber, the liquid starts flowing inside the compression chamber through the liquid admission line 1004 first, to the liquid admission slot 1006 second and finally to the Coanda profile 1008. The shroud element 1010 adjusts the throat area for the passage of the liquid over the Coanda profile 1008. While the liquid is inducted inside the chamber and flows over the Coanda profile 1008, the gas present in the chamber is transported by the liquid and inducts a circulation movement in the gas in the upper portion of the compression chamber due to the Coanda effect as shown in FIG. 11.

Figure 11:
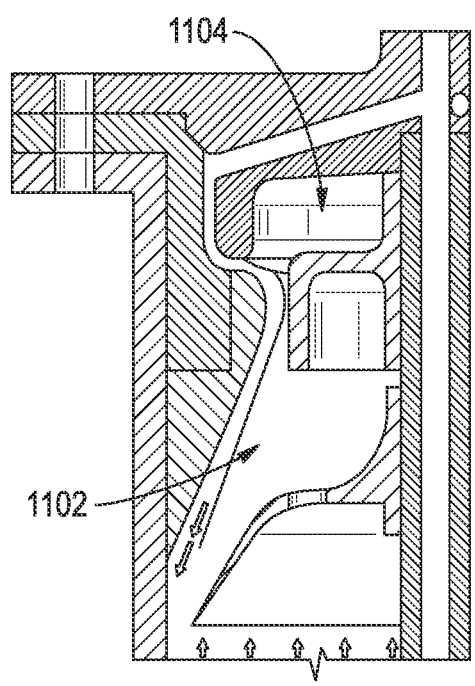
FIG. 11 is a cross sectional view of the compression chamber of FIG. 10 to demonstrate the intra-cooling of the gas using the Coanda effect.

As shown in FIG. 11, the circulation of the gas in the bottom 1102 and upper part 1104 of the compression volume, simultaneous with the contact of the gas with the liquid, promotes and increases the heat transfer between the liquid and the gas. This embodiment, which promotes interaction between the gas and the liquid, can also be used to advantage for mass transfer. For example, the transfer rate of an unwanted component in the gas, (as in the case of water in natural gas) can be accelerated by the Coanda effect, to the liquid (for example an adsorbent fluid such as Triethylene Glycol). In this embodiment, the enhancement of mass transfer, as well as heat transfer can be used to advantage for many chemical processes where a component in the gas to be compressed can be transferred to the liquid. By this mechanism, the liquid cools down the gas and favors the heat transfer to the liquid. The liquid, once it has left the Coanda profile 1008, flows along the wall of the compression chamber transferring the compression heat from the gas to the chamber wall and ultimately to the ambient (FIG. 11). The use of the Coanda effect can provide an efficient mechanism to increase the heat transfer between the gas and the liquid providing the main means for gas intra-cooling and therefore near-isothermal compression.

Alternative or additional means for gas intra-cooling include adopting internal geometries in the compression chamber, including capillary tubing. In one embodiment, the capillary tubing can have small diameters (for example, of the order of 1 mm or less). These internal geometries can provide an alternative or additional way to increase heat transfer between the gas and the liquid by means of increasing the surface contact between the gas and the metallic surfaces and, eventually, the compression liquid. These internal geometries might be located, for example, in the upper portion of the compression chambers just upstream of the discharging lines for the gas.

An alternative or additional method of gas intra-cooling can include admission of the liquid in such a way that the liquid itself will flow along the internal surface of the container, in order to enhance the transfer of the heat from the gas to the ambient through the wall of the container. In this embodiment, internal geometries, such as spiral ribs, may be built into the compression chamber to channel the liquid flow as it runs down the interior surface of the compression chamber to maximize the contact surface area and contact time between the liquid and the compression chamber surface. In addition this embodiment will reduce the depth of penetration of the liquid jets that fall into the liquid volume at the bottom of the compression chamber.

An alternative or additional method of gas intra-cooling can include admission of the liquid via a spray mechanism. The spray technique may or may not result in partial or complete vaporization of the liquid which will result in a substantial cooling effect on the gas.

Because of the way gas is compressed in the LPC 702 and HPC 704, and in general in any liquid piston compression stage (by direct contact with the compression fluid), a separation system might be needed to separate the compression liquid droplets from the gas stream before the gas is discharged from the system. Therefore, embodiments of the system for compressing a gas as described herein can also be equipped with a separation system to separate out the liquid droplets that might become entrained in the main gas stream before the gas is delivered to the final destination.

Separation of the liquid droplets from the gas stream can be achieved by the use of well-known mechanical separation techniques currently used, for example, in the field of natural gas processing. A possible separator design considers the usage of a multistage separation system that could be characterized by one or a combination of the following elements: First Stage: Inlet Vane to distribute the gas evenly in the separation system; Second Stage: Wire Mesh Demister or similar, for example a highly porous media (90% or more closure), liquid droplets are intercepted by wires, while the gas flows through the mesh; and Third Stage: Cyclonic Separator. A tangential velocity is given to the gas. Due to the centrifugal force, the droplets are deposited on the walls and collected.

In an embodiment in which embodiments of the system described herein are used to compress a gas that needs to be dehydrated, the system can use the compression liquid for scrubbing of the residual moisture content in the gas. This can be achieved by using a hygroscopic liquid as compression liquid. A possible candidate for compression liquid is Triethylene Glycol (TEG). However, any other substance of the glycol family can be used for the same purpose, together with any other fluid presenting high hygroscopic properties. TEG is successfully used in industrial natural gas dehydration units due to its high hygroscopic properties. Moisture in the natural gas stream is absorbed in TEG, TEG is then separated from the moisture by heat addition and distillation of the water. In addition to the high hygroscopicity, TEG presents a number of other desirable physical properties that make it a good candidate as compression liquid in embodiments of the system: low volatility (boiling point at 1 atmosphere is 288*C), high solubility of water in TEG (100%), specific gravity (1.12@20° C.), freezing point depression (−4.3° C.), very low toxicity, low cost, relatively simple regeneration by heat addition, and solvent properties. The liquid can also be used to wash, scrub, or cleanse the gas of other impurities, such as particulate, or other undesired chemicals. The large interaction that is promoted between the liquid and the gas via the Coanda effect, can also enhance mass transfer and in fact this feature can be used for other applications where a liquid is used to cleanse of purify a gas, or vise versa. In addition, a filter, chemical processing element or heat exchanger may be added to restore the fluid to its original condition.

If a hygroscopic liquid is used as compression liquid, this liquid can capture the moisture originally present in the gas stream while the gas is compressed. Because of the characteristics of the design of embodiments of the system described herein, the contact between the compression liquid and the gas may be enhanced during the compression process allowing for the compression liquid to effectively capture the moisture in the gas (see, for example, FIG. 11).

For example, if the gas being compressed is natural gas, assuming a natural gas pipeline moisture content of 7 lbs/MMscf (0.38 g/GGE), it can be estimated that the moisture that can be captured in the TEG (or any other hygroscopic liquid) will be of the order of about 2.7 g per 1 OGGE of compressed gas (10 hours of operation@1 GGE/hr, typical for a complete fill up of an automobile fuel tank). In order to reduce complexity and cost, in one embodiment no regeneration system is provided in the system for compressing gas. The liquid will be drained and changed in the system after a defined number of hours of operation (for example 1000 hours). This system will eliminate the need for a separate dryer system as is typically present in other commercial products using conventional compression techniques. In case cost and added complexity is not an issue, a regeneration system for the compression liquid can be added to embodiments of the system described herein. Alternatively or additionally a gas dryer can be added downstream the compression system or, alternatively, downstream the separator (in case a separator is present in the system).

In the case in which the gas being compressed is natural gas, the heavy hydrocarbons present in small percentages in the natural gas can be actively maintained in the liquid state by maintaining the temperature of the liquid appropriately higher than the dew point of the gas at each pressure. Please refer to FIGS. 12A and 12B, which show the phase diagrams of natural gas.

Figures 12A, 12B:
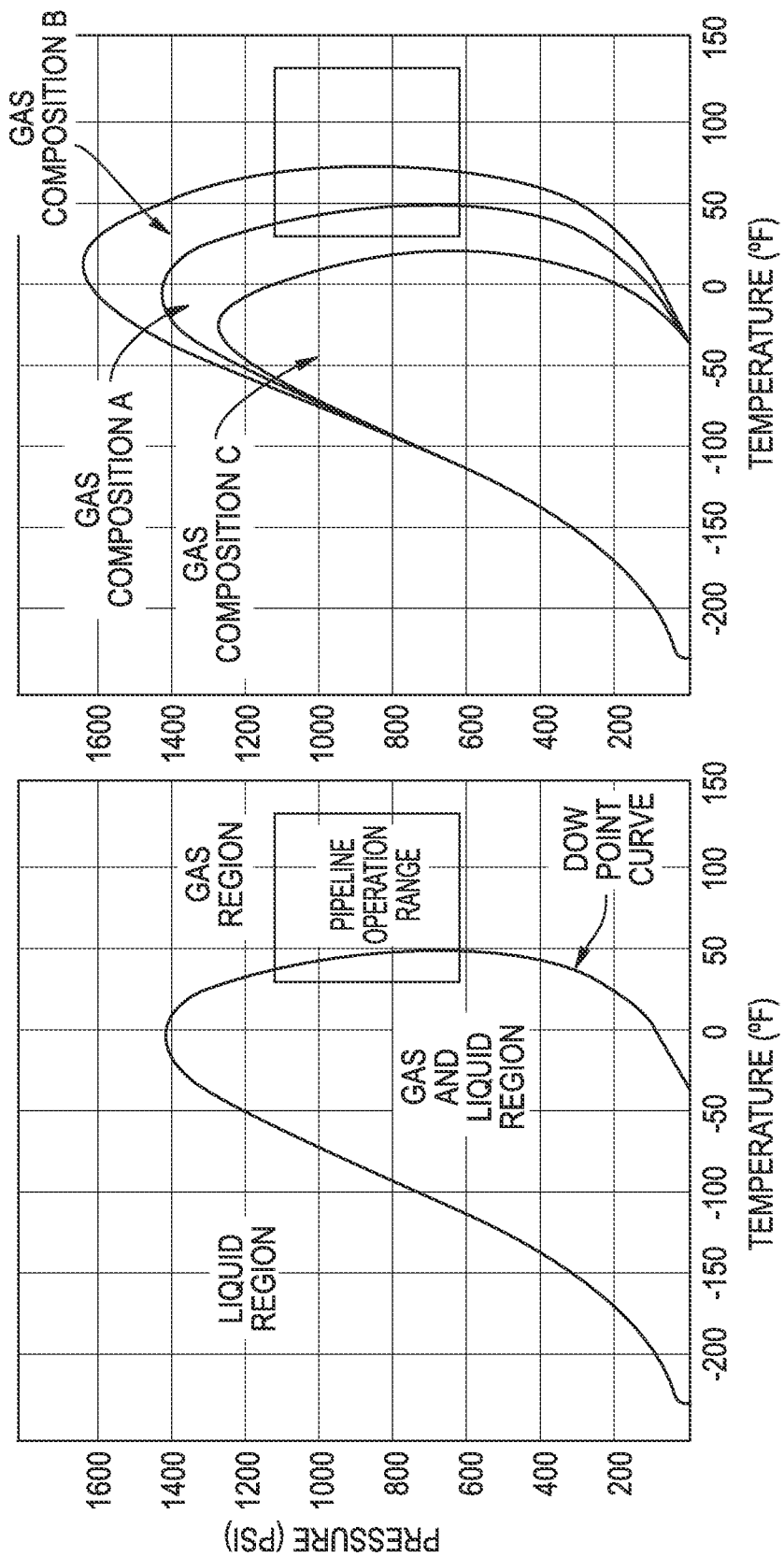
FIGS. 12A and 12B are phase diagrams of natural gas with typical pipeline composition.

FIG. 12A presents the phase diagram of a natural gas with typical pipeline composition. The region inside the curve represents the area in which gas and liquid are simultaneously present in the mixture. The line that separates the Gas/Liquid region from the Gas region is called Dew Point curve. By maintaining the temperature of the gas appropriately higher than the dew point of the mixture (for example at 65 F), liquid drop-out will not occur.

FIG. 12B represents the situation related to three different natural gas compositions. Gas composition A is a typical one (same as in FIG. 12A), Gas composition B and Gas composition C represent, instead, mixtures with higher and lower content of heavy hydrocarbons, respectively. Through this plot, it is apparent that the dew point curve tends to move towards higher temperatures with higher content of heavy hydrocarbon. For this reason, embodiments of the system described herein can be tuned in order to avoid liquid drop-out independently from the composition of the pipeline natural gas by simply controlling the gas temperature during compression.

Although the present disclosure has been described with reference to preferred embodiments, workers skilled in the art will recognize that changes can be made in form and detail without departing from the spirit and scope of the present disclosure.

What is claimed:

1. A method of compressing a gas, comprising:
   pumping, using a pump, at least a portion of a liquid contained in a first chamber to a second chamber initially containing only a gas at a first pressure such that the at least the portion of the liquid pumped into the second chamber compresses the gas in the second chamber to a second pressure greater than the first pressure and
   admitting the at least the portion of the liquid pumped into the second chamber into the second chamber using a liquid admission mechanism configured to admit the at least the portion of the liquid pumped into the second chamber such that the admitted liquid flows along at least an internal wall surface of the second chamber.

2. The method of claim 1, wherein said first chamber and said second chamber are fluidly connected through the pump.

3. The method of claim 1, wherein the first chamber comprises a first volume of the liquid and a first volume of the gas.

4. The method of claim 1, wherein admitting the at least the portion of the liquid pumped into the second chamber into the second chamber using the liquid admission mechanism configured to admit the at least the portion of the liquid pumped into the second chamber comprises admitting the at least the portion of the liquid pumped into the second chamber into the second chamber using a Coanda nozzle.

5. The method of claim 1, further comprising:
   receiving a pressurized gas into the first chamber having the liquid at the same time the at least the portion of the liquid in the first chamber is being pumped to the second chamber using the pump; and
   compressing the gas in the second chamber to the second pressure greater than the first pressure by the portion of the liquid pumped into the second chamber.

6. The method of claim 5, wherein the pressurized gas is received into the first chamber from a buffer chamber.

7. The method of claim 1, wherein any one or both of the first chamber and the second chamber have an internal geometry configured for admitting the liquid into the respective chamber so that the admitted liquid flows at least along a portion of the internal wall surface of the respective chamber for heat and mass transfer between the gas, the liquid and the portion of the internal surface of the respective chamber.

8. The method of claim 1, further comprising circulating the gas and the liquid in a bottom and an upper part of any one or both of the first chamber or second chamber for heat and mass transfer between the liquid and the gas.

9. The method of claim 1, wherein the liquid is admitted to any one or both of the first chamber and the second chamber via a nozzle that acts as the liquid admission mechanism.

10. A method of compressing a gas, comprising:
    providing a first chamber, said first chamber having a first volume of a liquid and a first volume of a gas;
    providing a second chamber, said second chamber having a second volume of the liquid and a second volume of the gas, wherein the second volume of the gas in the second chamber is at a first pressure and said first chamber and said second chamber are fluidly connected through a pump; and
    receiving a pressurized gas into the first chamber having the first volume of the liquid and the first volume of the gas and simultaneously pumping, using the pump, at least a portion of the first volume of the liquid in the first chamber to the second chamber such that the at least the portion of the first volume of the liquid pumped into the second chamber compresses the second volume of the gas in the second chamber to a second pressure greater than the first pressure, wherein the at least the portion of the first volume of the liquid pumped into the second chamber is admitted into the second chamber using a liquid admission mechanism so that the admitted liquid flows along an internal wall surface of the second chamber.

11. The method of claim 10, wherein the pressurized gas is received into the first chamber from a buffer chamber.

12. The method of claim 10, wherein any one or both of the first chamber and the second chamber have an internal geometry configured for admitting the liquid into the respective chamber so that the admitted liquid flows at least along a portion of the internal wall surface of the respective chamber for heat and mass transfer between the gas, the liquid and the portion of the internal wall surface of the respective chamber.

13. The method of claim 10, further comprising circulating the gas and the liquid in a bottom and an upper part of any one or both of the first chamber or second chamber to for heat and mass transfer between the liquid and the gas.

14. The method of claim 10, wherein the liquid is admitted to the first chamber or the second chamber via a nozzle that comprises the liquid admission mechanism.

15. A system for compressing a gas, comprising:
a first chamber, said first chamber having a volume of liquid;
a second chamber, said second chamber initially having only at least a volume of a gas at a first pressure;
a pump, wherein the pump is in fluid communication with the first chamber and the second chamber, wherein the pump pumps at least a portion of the volume of liquid contained in the first chamber to the second chamber containing the gas at the first pressure such that the portion of the volume of the liquid pumped into the second chamber compresses the volume of gas in the second chamber to a second pressure greater than the first pressure, wherein the portion of the volume of the liquid pumped into the second chamber is admitted into the second chamber via a liquid admission mechanism so that the admitted liquid flows along an internal wall surface of the second chamber.

16. The system of claim 15, wherein the first chamber having the liquid further comprises a gas inlet that introduces a pressurized gas into the first chamber at the same time the portion of the volume of the liquid in the first chamber being pumped to the second chamber using the pump.

17. The system of claim 16 further comprising a buffer chamber in fluid connection with the first chamber, wherein the pressurized gas is received into the first chamber from the buffer chamber.

18. The system of claim 15, wherein any one or both of the first chamber and the second chamber have an internal geometry configured for admitting the liquid into the respective chamber so that the admitted liquid flows at least along a portion of the internal wall surface of the respective chamber for heat and mass transfer between the gas, the liquid and the portion of the internal wall surface of the respective chamber.

19. The system of claim 15, further comprising circulating the gas and the liquid in a bottom and an upper part of any one or both of the first chamber or second chamber for heat and mass transfer between the liquid and the gas.

20. The system of claim 15, wherein liquid admission mechanism comprises a Coanda nozzle.

* * * * *